United States Patent
Kawamata

(10) Patent No.: US 9,855,968 B2
(45) Date of Patent: Jan. 2, 2018

(54) VEHICLE CONTROL SYSTEM AND VEHICLE CONTROL METHOD

(71) Applicant: TOYOTA JIDOSHA KABUSHIKI KAISHA, Toyota-shi, Aichi-ken (JP)

(72) Inventor: Shinya Kawamata, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 56 days.

(21) Appl. No.: 15/036,894

(22) PCT Filed: Nov. 14, 2014

(86) PCT No.: PCT/IB2014/002643
§ 371 (c)(1),
(2) Date: May 16, 2016

(87) PCT Pub. No.: WO2015/071756
PCT Pub. Date: May 21, 2015

(65) Prior Publication Data
US 2016/0280266 A1 Sep. 29, 2016

(30) Foreign Application Priority Data

Nov. 18, 2013 (JP) .................. 2013-238308

(51) Int. Cl.
*B62D 15/00* (2006.01)
*B62D 15/02* (2006.01)
(Continued)

(52) U.S. Cl.
CPC ......... *B62D 15/025* (2013.01); *B60W 10/184* (2013.01); *B60W 10/20* (2013.01);
(Continued)

(58) Field of Classification Search
CPC ............ B62D 15/025; B62D 15/0265; B60W 30/08–30/09; B60W 10/20;
(Continued)

(56) References Cited

U.S. PATENT DOCUMENTS

| 6,359,553 B1 | 3/2002 | Kopischke |
| 2009/0299593 A1 | 12/2009 | Borchers |
| 2011/0015818 A1 | 1/2011 | Brauer et al. |

FOREIGN PATENT DOCUMENTS

| GB | 2501167 A | 10/2013 |
| JP | 2006-199055 A | 8/2006 |

(Continued)

*Primary Examiner* — Spencer D Patton
(74) *Attorney, Agent, or Firm* — Sughrue Mion, PLLC

(57) ABSTRACT

A vehicle control system includes a controller configured to, when a collision of a host vehicle with another vehicle traveling in a direction that intersects with a front-rear direction of the host vehicle is predicted (Yes in S20), when the collision with the other vehicle is unavoidable (No in S70) and when the other vehicle comes into collision with the host vehicle in the intersecting direction, automatically turn a steered wheel of the host vehicle before the host vehicle collides with the other vehicle. The controller is configured to vary a direction of the steered wheel that is turned by the controller (S100 or S110) in response to whether there is a target, other than the other vehicle, around the host vehicle (Yes or No in S90).

9 Claims, 8 Drawing Sheets

(51) Int. Cl.
  *B60W 10/184*  (2012.01)
  *B60W 10/20*  (2006.01)
  *B60W 30/085*  (2012.01)
  B60W 30/08  (2012.01)
  B60W 50/14  (2012.01)

(52) U.S. Cl.
  CPC ....... *B60W 30/085* (2013.01); *B62D 15/0265* (2013.01); *B60T 2201/024* (2013.01); *B60W 2030/082* (2013.01); *B60W 2050/143* (2013.01); *B60W 2710/207* (2013.01)

(58) Field of Classification Search
  CPC ....... B60W 2710/207; B60W 2030/082; B60T 2201/024
  See application file for complete search history.

(56) References Cited

FOREIGN PATENT DOCUMENTS

| | | |
|---|---|---|
| JP | 2007-137085 A | 6/2007 |
| JP | 2012-045984 A | 3/2012 |
| WO | 2006/045259 A1 | 5/2006 |
| WO | 2008/009519 A1 | 1/2008 |

VEHICLE LEFT SIDE ⟵⟶ VEHICLE RIGHT SIDE

VEHICLE LEFT SIDE ⟵⟶ VEHICLE RIGHT SIDE

VEHICLE LEFT SIDE ⟵⟶ VEHICLE RIGHT SIDE

VEHICLE LEFT SIDE ⟵⟶ VEHICLE RIGHT SIDE

VEHICLE CONTROL SYSTEM AND VEHICLE CONTROL METHOD

BACKGROUND OF THE INVENTION

1. Field of the Invention

The invention relates to a vehicle control system and a vehicle control method.

2. Description of Related Art

There is an existing collision mitigation system. For example, Japanese Patent Application Publication No. 2012-45984 (JP 2012-45984 A) describes a technique of a collision mitigation system including hazard prediction determination means 48 and forced steering means 50. The hazard prediction determination means 48 of JP 2012-45984 A) determines whether a host vehicle is in a hazard prediction state where the following situation is predicted as a result of a collision of another vehicle with the host vehicle. The situation is that the host vehicle enters from a driving lane of the host vehicle toward an oncoming lane, a lane adjacent to the driving lane or a sidewalk in contradiction to driver's intention. When the hazard prediction determination means 48 determines that the host vehicle is in the hazard prediction state, the forced steering means 50 forcibly changes the direction of steered wheels of the host vehicle to a direction parallel to a direction in which the driving lane extends.

There is still room for consideration in mitigating damage after a collision with another vehicle. For example, in the case of an intersection collision, there is a possibility that the host vehicle is pushed out by the energy of the collision and moves toward a surrounding pedestrian, or the like. When there is a target, such as a pedestrian, around the host vehicle, it is preferable not to cause damage to the pedestrian, or the like.

At the time of a collision of another vehicle with the host vehicle, when there is a target other than the other vehicle around the host vehicle, it is desired to suppress damage to the target.

SUMMARY OF THE INVENTION

The invention provides a vehicle control system and vehicle control method that are able to suppress damage to a surrounding target at the time of a collision with another vehicle.

An aspect of the invention provides a vehicle control system. The vehicle control system includes a controller. The controller is configured to, when a collision of a host vehicle with another vehicle traveling in an intersecting direction that intersects with a front-rear direction of the host vehicle is predicted, when the collision with the other vehicle is unavoidable and when the other vehicle comes into collision with the host vehicle in the intersecting direction, automatically turn a steered wheel of the host vehicle before the host vehicle collides with the other vehicle. The controller is configured to vary a direction of the steered wheel that is turned by the controller in response to whether there is a target, other than the other vehicle, around the host vehicle.

In the vehicle control system, the controller may be configured to, when a collision of the host vehicle with the other vehicle is predicted, execute assisting control for assisting in avoiding the collision with the other vehicle by controlling the host vehicle through at least one of deceleration control, brake control, and alarm control. The controller may be configured to, when the collision with the other vehicle is unavoidable even by executing the assisting control, automatically turn the steered wheel.

In the vehicle control system, the controller may be configured to control a moving direction of the host vehicle after a collision with the other vehicle by turning the steered wheel in a direction different from the direction of the steered wheel before turning of the steered wheel by the controller is started.

In the vehicle control system, the controller may be configured to, when there is no target, other than the other vehicle, around the host vehicle, turn the steered wheel toward the other vehicle.

In the vehicle control system, the controller may be configured to, when there is a target, other than the other vehicle, on a side across from the other vehicle side in a width direction of the host vehicle, turn the steered wheel toward the target side.

In the vehicle control system, the controller may be configured to, when there is the target, other than the other vehicle, on the side across from the other vehicle side in the width direction of the host vehicle, release a brake device in addition to automatic turning of the steered wheel.

In the vehicle control system, the controller may be configured to, when there is the target, other than the other vehicle, on the side across from the other vehicle side in the width direction of the host vehicle, further execute forward travel control for automatically causing the host vehicle to travel forward.

In the vehicle control system, the controller may be configured to, when there is no target, other than the other vehicle, around the host vehicle, release a brake device in addition to automatic turning of the steered wheel.

In the vehicle control system, the controller may be configured to further execute backward travel control for automatically causing the host vehicle to travel backward. The controller may be configured to, when a collision with the other vehicle is predicted at a stop position of the host vehicle after execution of any one of the deceleration control, the brake control and the alarm control, and when there is no obstacle to a rear of the host vehicle, assist in avoiding the collision with the other vehicle through the backward travel control.

In the vehicle control system, the controller may be configured to, when there is an obstacle to the rear of the host vehicle, prohibit the backward travel control and execute protection control for protecting an occupant of the host vehicle.

The vehicle control system according to the aspect of the invention includes a controller. The controller is configured to, when a collision of a host vehicle with another vehicle traveling in an intersecting direction that intersects with a front-rear direction of the host vehicle is predicted, when the collision with the other vehicle is unavoidable and when the other vehicle comes into collision with the host vehicle in the intersecting direction, automatically turn a steered wheel of the host vehicle before the host vehicle collides with the other vehicle. The controller is configured to vary a direction of the steered wheel that is turned by the controller in response to whether there is a target, other than the other vehicle, around the host vehicle. With the vehicle control system according to the invention, it is advantageously possible to suppress damage to a target around a host vehicle at the time of a collision with another vehicle.

Another aspect of the invention provides a control method for a vehicle. The vehicle includes a controller. The control method includes, when a collision of a host vehicle with another vehicle traveling in an intersecting direction that intersects with a front-rear direction of the host vehicle is predicted, when the collision with the other vehicle is unavoidable and when the other vehicle comes into collision with the host vehicle in the intersecting direction, automatically turning, by the controller, a steered wheel of the host vehicle before the host vehicle collides with the other vehicle; and varying, by the controller, a direction of the steered wheel that is turned by the controller in response to whether there is a target, other than the other vehicle, around the host vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a vehicle control system according to an embodiment of the invention will be described in detail with reference to the accompanying drawings. The invention is not limited to this embodiment. Component elements in the following embodiment include ones that can be easily conceived of by persons skilled in the art or substantially identical ones.

Figure 1:
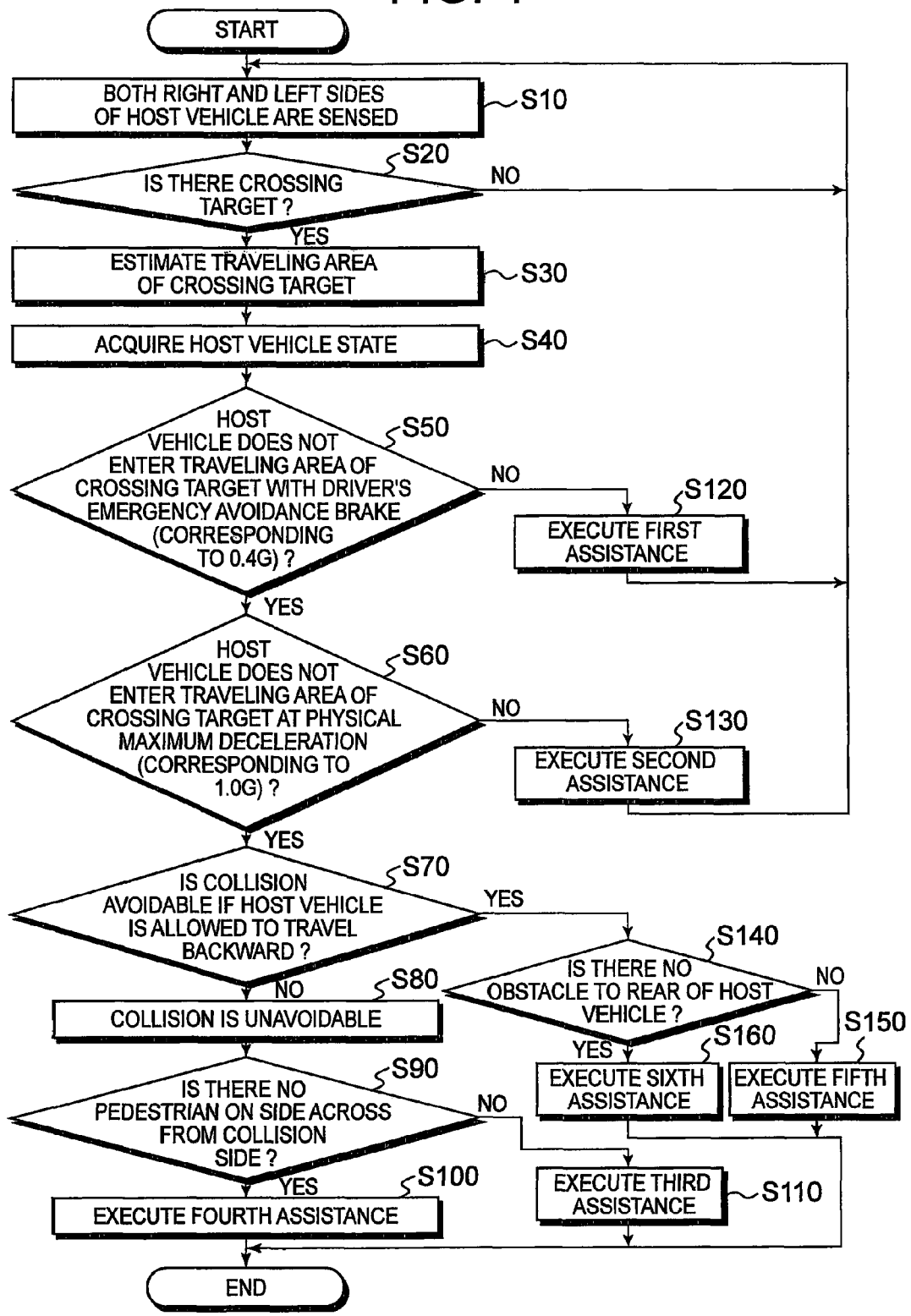
FIG. 1 is a flowchart that shows the operation of a vehicle control system according to an embodiment.
Figure 2:
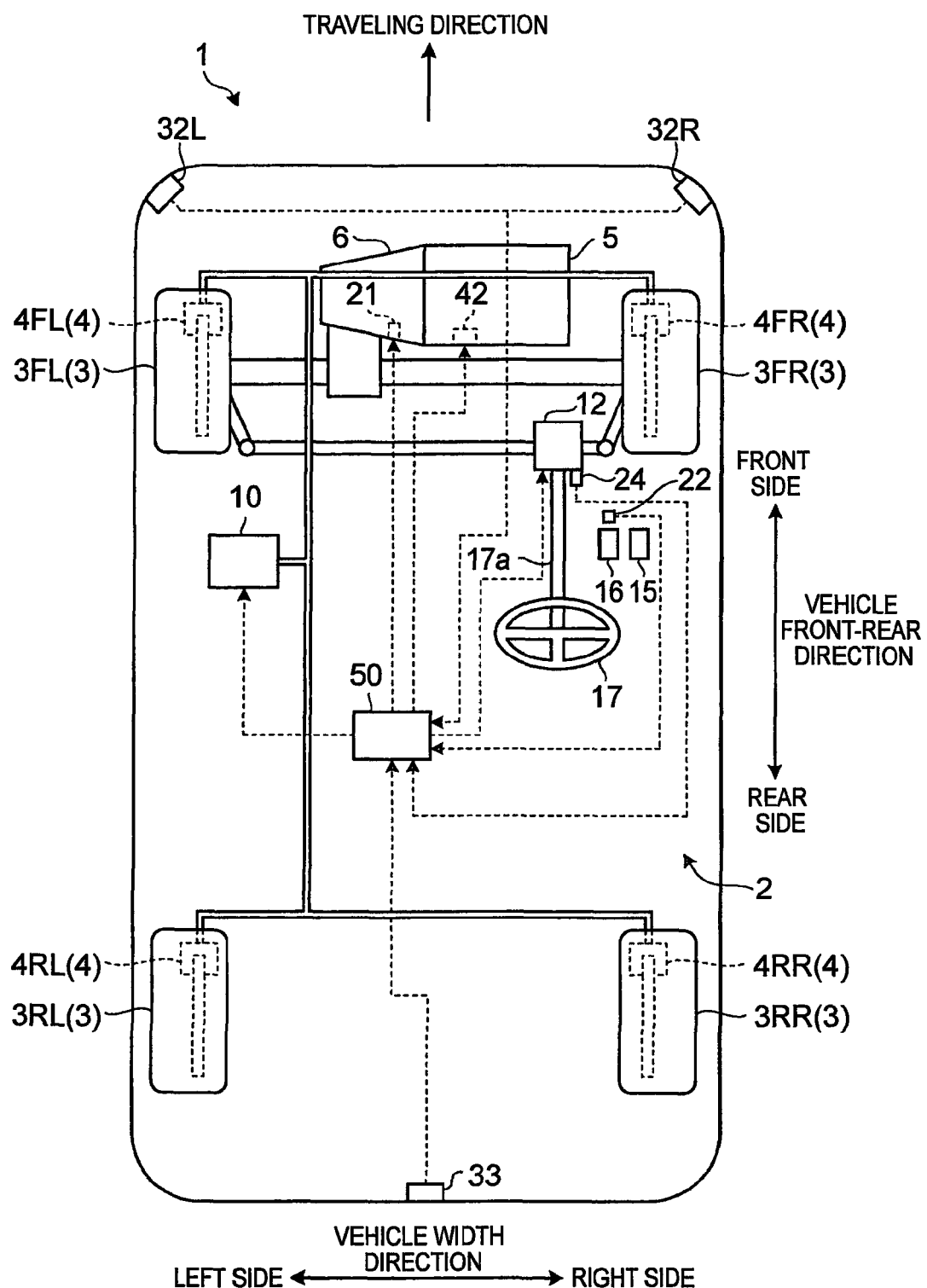
FIG. 2 is a view that shows the schematic configuration of a vehicle according to the embodiment.
Figure 3:
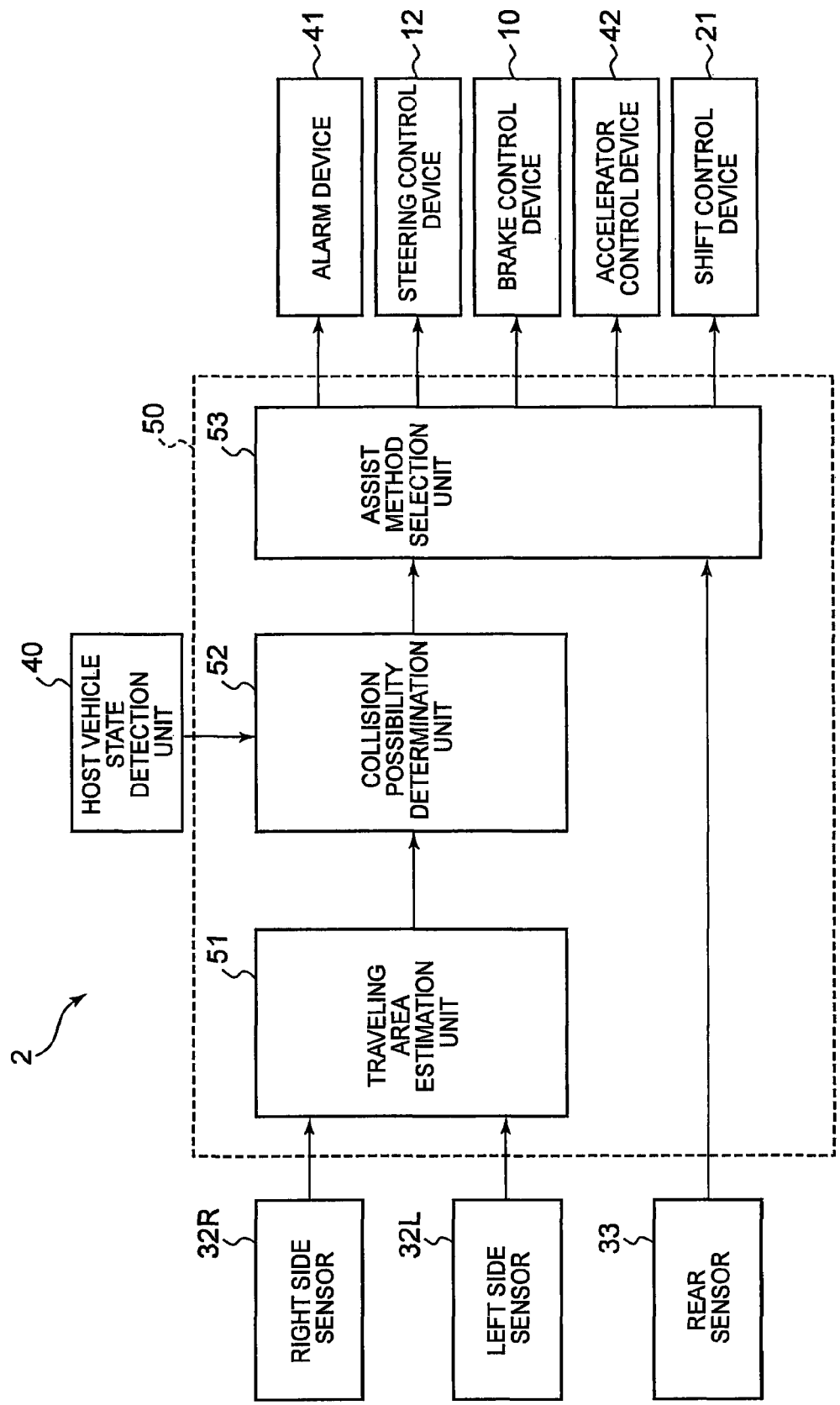
FIG. 3 is a block diagram of the vehicle control system according to the embodiment.
Figure 4:
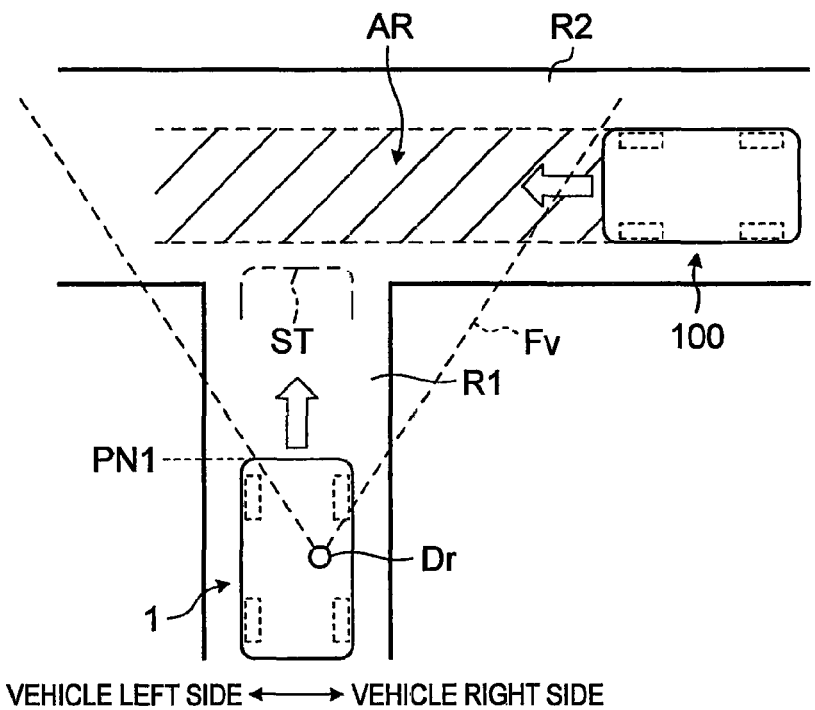
FIG. 4 is a view that illustrates a situation that alarm control according to the embodiment is executed.
Figure 5:
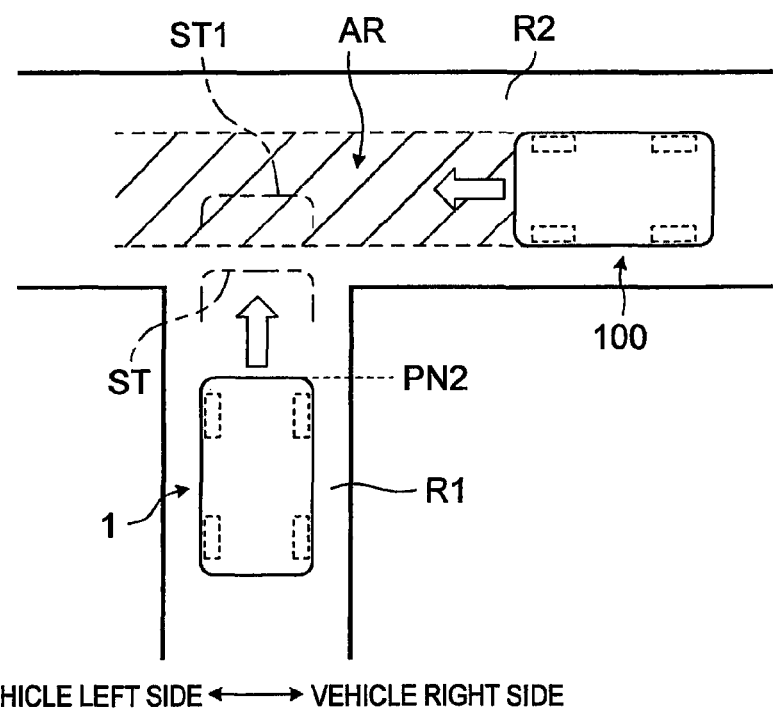
FIG. 5 is a view that illustrates a situation that brake control according to the embodiment is executed.
Figure 6:
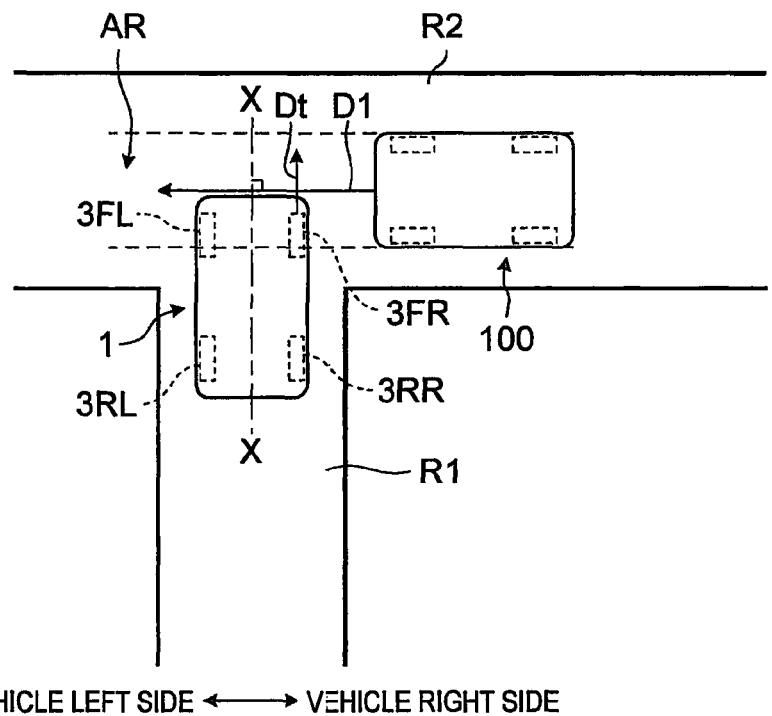
FIG. 6 is a view that illustrates directions.
Figure 7:
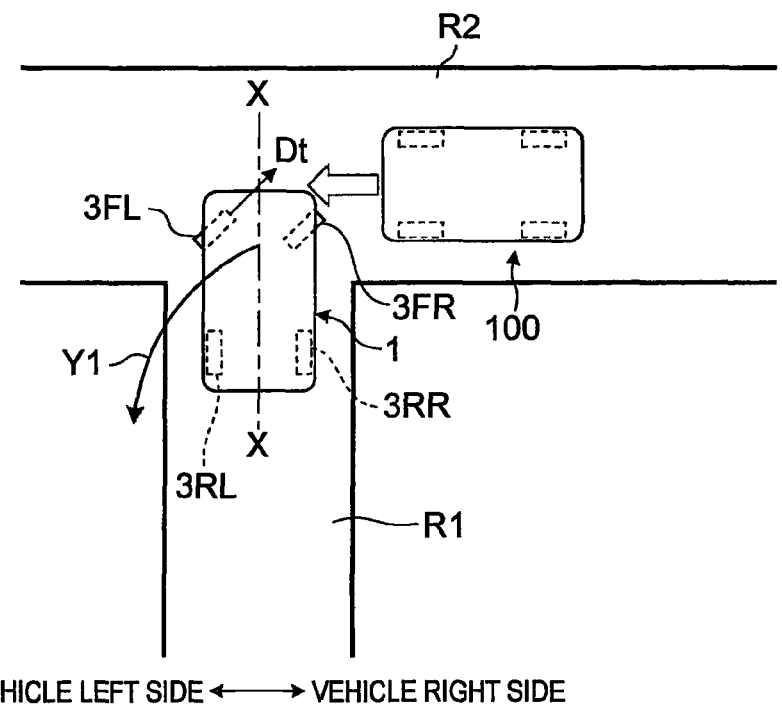
FIG. 7 is a view that illustrates control in the case where there is no target.
Figure 8:
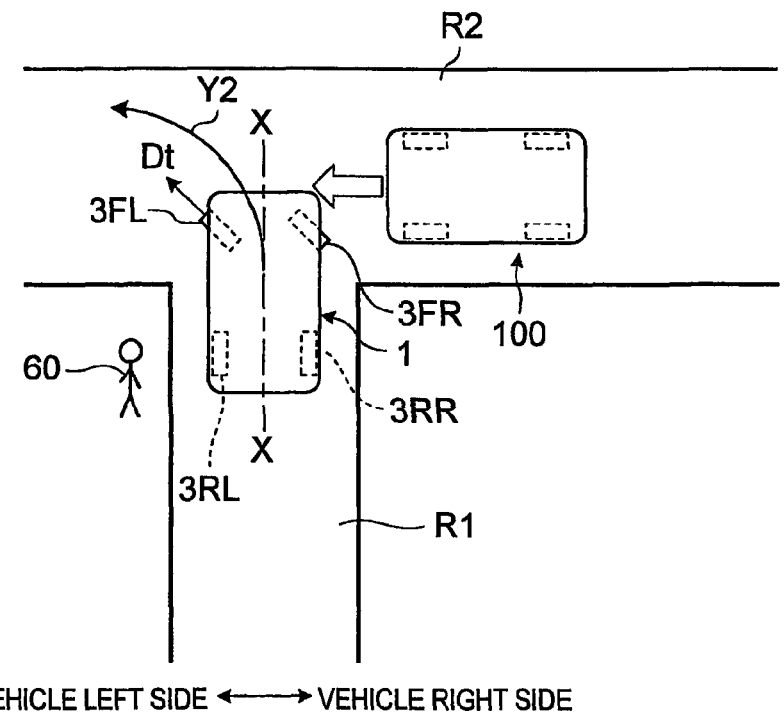
FIG. 8 is a view that illustrates control in the case where there is a target.
Figure 9:
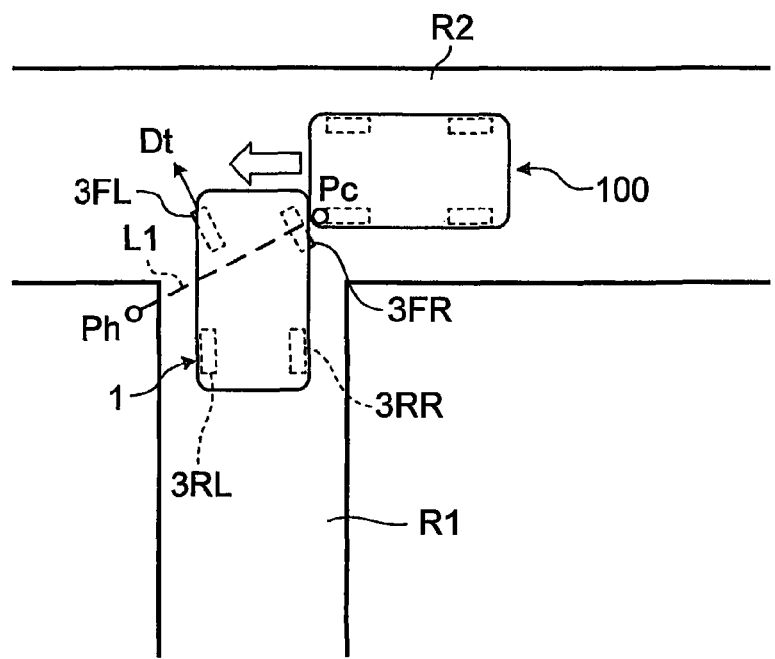
FIG. 9 is a view that illustrates a method of determining the direction of steered wheels.
Figure 10:
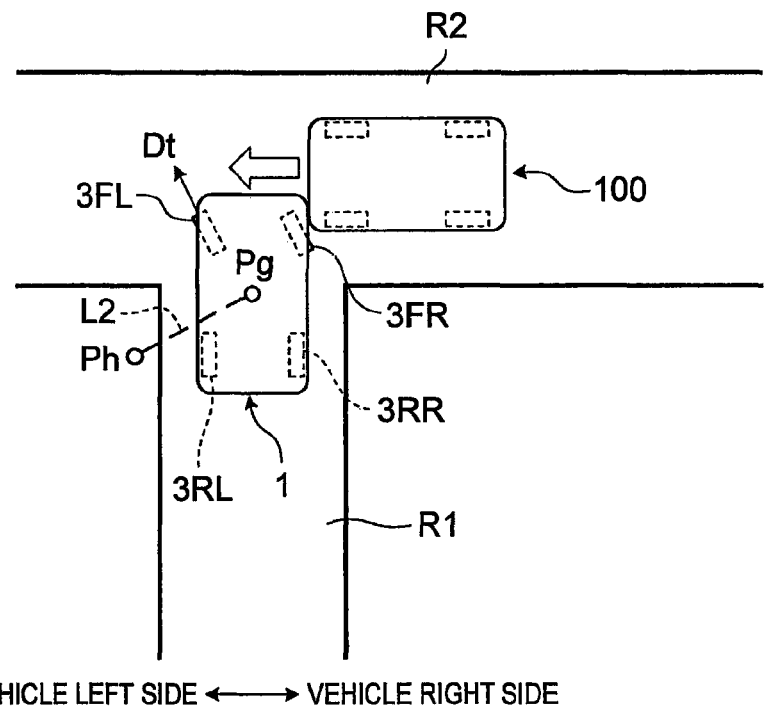
FIG. 10 is another view that illustrates a method of determining the direction of the steered wheels.
Figure 11:
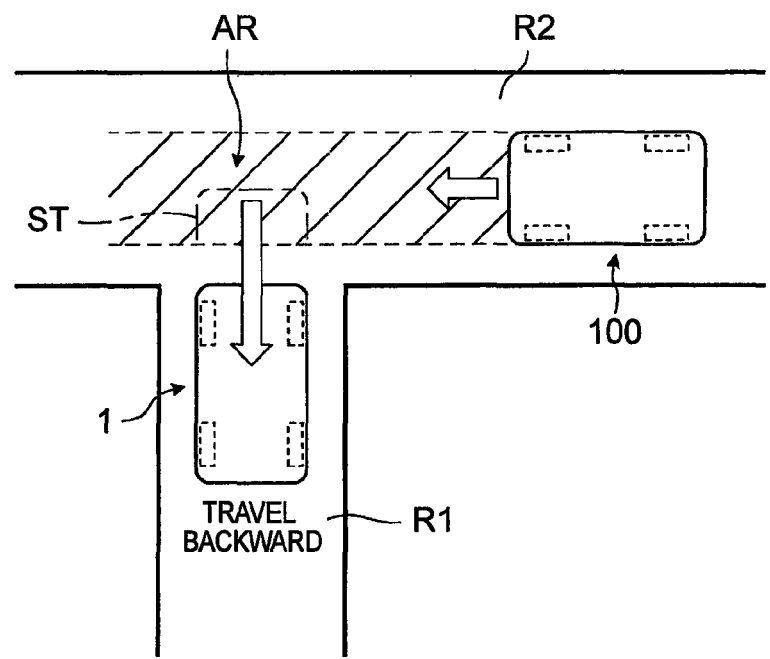
FIG. 11 is a view that illustrates backward travel control according to the embodiment.
Figure 12:
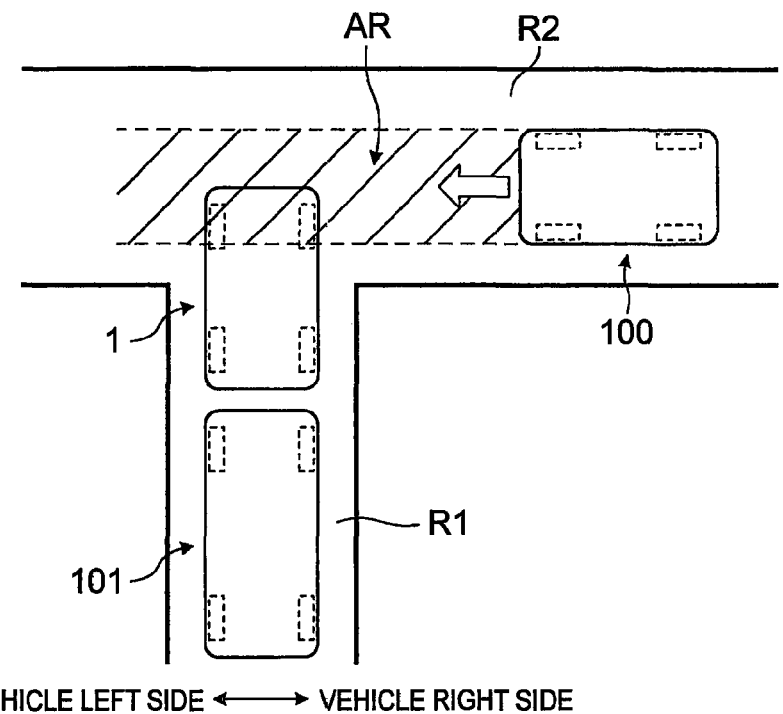
FIG. 12 is a view that shows a situation that there is an obstacle to the rear of the host vehicle.

The embodiment will be described with reference to FIG. 1 to FIG. 12. The present embodiment relates to a vehicle control system. FIG. 1 is a flowchart that shows the operation of the vehicle control system according to the embodiment of the invention. FIG. 2 is a view that shows the schematic configuration of a vehicle according to the embodiment. FIG. 3 is a block diagram of the vehicle control system according to the embodiment. FIG. 4 is a view that illustrates a situation that alarm control according to the embodiment is executed. FIG. 5 is a view that illustrates a situation that brake control according to the embodiment is executed. FIG. 6 is a view that illustrates directions. FIG. 7 is a view that illustrates control in the case where there is no target. FIG. 8 is a view that illustrates control in the case where there is a target. FIG. 9 is a view that illustrates a method of determining the direction of steered wheels. FIG. 10 is another view that illustrates a method of determining the direction of the steered wheels. FIG. 11 is a view that illustrates backward travel control according to the embodiment. FIG. 12 is a view that shows a situation that there is an obstacle to the rear of the host vehicle.

As shown in FIG. 2, the host vehicle 1 according to the embodiment includes the vehicle control system 2, an engine 5, a transmission 6, wheels 3 and brake devices 4. The vehicle control system 2 includes an ECU 50, a shift control device 21, a steering control device 12, a brake control device 10, a right side sensor 32R, a left side sensor 32L and a rear sensor 33.

The host vehicle 1 according to the present embodiment includes the two front wheels 3FR, 3FL and the two rear wheels 3RR, 3RL. The right front wheel 3FR and the left front wheel 3FL are steered wheels and drive wheels. The right rear wheel 3RR and the left rear wheel 3RL are driven wheels. The steered wheels 3FR, 3FL are connected to a steering wheel 17. A driver is allowed to turn the steered wheels 3FR, 3FL by rotating the steering wheel 17.

The steering control device 12 includes a rotary driving source, such as a motor. The steering control device 12 according to the present embodiment is an electric power steering (EPS) system. The steering wheel 17 is connected to the steered wheels 3FR, 3FL via a shaft 17a and the steering control device 12. The steering control device 12 is able to turn the steered wheels 3FR, 3FL by transmitting torque to the steered wheels 3FR, 3FL. The torque is generated by the rotary driving source. For example, when steering torque is input to the steering wheel 17 by the driver, the steering control device 12 outputs assist torque based on the steering torque that is input via the shaft 17a. The steering control device 12 according to the present embodiment is able to automatically turn the steered wheels 3FR, 3FL irrespective of driver's steering operation. A steering angle sensor 24 is provided in the host vehicle 1. The steering angle sensor 24 detects the rotation angle position of the shaft 17a. The rotation angle position of the shaft 17a corresponds to a steered angle of the steered wheels 3FR, 3FL, that is, the direction of the steered wheels 3FR, 3FL. Thus, it is possible to acquire the direction of the steered wheels 3FR, 3FL on the basis of the detected result of the steering angle sensor 24.

The engine 5 converts combustion energy of fuel to rotation motion, and outputs the rotation motion. The transmission 6 changes the speed of rotation of the engine 5, and outputs the rotation to the steered wheels 3FR, 3FL. The transmission 6 according to the present embodiment is an automatic transmission that is able to automatically change the speed ratio.

Each of the brake devices 4 generates braking force in the corresponding wheel 3 by restricting rotation of the corresponding wheel 3. The brake devices 4FR, 4FL, 4RR, 4RL are respectively arranged in the wheels 3FR, 3FL, 3RR, 3RL. The brake control device 10 controls braking forces that are respectively generated by the brake devices 4FR, 4FL, 4RR, 4RL. Each of the brake devices 4 restricts rotation of the corresponding wheel 3 by hydraulic pressure supplied, and generates braking force based on the hydraulic pressure. The brake control device 10 controls braking forces that are respectively generated in the wheels 3FR, 3FL, 3RR, 3RL by adjusting hydraulic pressures that are respectively supplied to the brake devices 4FR, 4FL, 4RR, 4RL. The brake control device 10 is able to control the braking forces that are respectively generated in the wheels 3FR, 3FL, 3RR, 3RL to different values.

The right side sensor 32R detects a target to the right side of the host vehicle 1. The right side sensor 32R is arranged at the right front end of the host vehicle 1. The left side sensor 32L detects a target to the left side of the host vehicle 1. The left side sensor 32L is arranged at the left front end of the host vehicle 1. The rear sensor 33 detects a target to the rear of the host vehicle 1. The rear sensor 33 is arranged at the rear end of the host vehicle 1. For example, a radar sensor, a laser sensor, or the like, may be used as each of the sensors 32R, 32L, 33. A sensor that detects a target on the basis of captured image data may be used as each of the sensors 32R, 32L, 33. Each of the sensors 32R, 32L, 33 has the function of detecting a target that is present around the host vehicle 1. Each of the sensors 32R, 32L, 33 further has the function of calculating the direction of a detected target with reference to the host vehicle 1, a distance between the host vehicle 1 and the detected target and a relative velocity between the detected target and the host vehicle 1.

Each of the sensors 32R, 32L, 33 may further have the function of identifying a detected target. Identifiable targets include, for example, another vehicle, a pedestrian, a bicycle, a motorcycle, a baby carriage, and other mobile units. Each of the sensors 32R, 32L, 33 estimates the type of a detected target by, for example, matching the detected target with a model of an identification target that is stored in advance. These identification tasks may be executed by the ECU 50 that has acquired the detected results of the sensors 32R, 32L, 33.

A brake operation amount sensor 22 detects an operation amount of a brake pedal 16, such as a pedal stroke and pedal speed of the brake pedal 16 and a depression force on the brake pedal 16.

The ECU 50 is a controller that executes vehicle control over the host vehicle 1. The ECU 50 according to the present embodiment is an electronic control unit including a computer. The steering angle sensor 24, the brake operation amount sensor 22, the right side sensor 32R, the left side sensor 32L and the rear sensor 33 are connected to the ECU 50. Signals indicating the detected results of the sensors 22, 24, 32R, 32L, 33 are output to the ECU 50.

The ECU 50 controls the engine 5, the shift control device 21, the brake control device 10 and the steering control device 12. The ECU 50 is connected to an accelerator control device 42 of the engine 5, and executes fuel injection control, ignition control, throttle valve opening degree control, and the like, over the engine 5 via the accelerator control device 42. The ECU 50, for example, determines command values of a rotation speed and output torque of the engine 5 on the basis of the pedal operation amount of an accelerator pedal 15 and the vehicle speed, and outputs the command values to the accelerator control device 42. The accelerator control device 42 controls the operation of the engine 5 on the basis of the command values.

The shift control device 21 executes shift control over the transmission 6. The ECU 50 is connected to the shift control device 21, and outputs a shift command to the shift control device 21. The ECU 50, for example, determines a target speed ratio of the transmission 6 on the basis of a shift line set in advance. The ECU 50 outputs a command indicating the determined target speed ratio to the shift control device 21. The shift control device 21 controls the transmission 6 so that the received target speed ratio is established.

The ECU 50 is connected to the brake control device 10, and controls hydraulic pressures that are respectively supplied to the brake devices 4 of the wheels 3. A hydraulic pressure is generated in a master cylinder as a result of driver's depression operation on the brake pedal 16. The ECU 50 has the function of controlling the hydraulic pressure, which is generated through braking operation, to different hydraulic pressures that are actually respectively supplied to the brake devices 4 of the wheels 3. The ECU 50 is able to, for example, execute brake assist control for supplying a hydraulic pressure, which is higher than the hydraulic pressure generated by braking operation, to each of the brake devices 4 of the wheels 3. The ECU 50 outputs, to the brake control device 10, command values of hydraulic pressures that are supplied to the brake devices 4 of the wheels 3. The brake control device 10 adjusts the hydraulic pressures that are supplied to the brake devices 4 of the wheels 3 in response to the received command values of the hydraulic pressures.

The ECU 50 according to the present embodiment has the function of turning the steered wheels 3FR, 3FL in a direction different from the direction of the steered wheels 3FR, 3FL according to driver's steering. In the specification, control for automatically turning the steered wheels 3FR, 3FL by the steering control device 12, for example, control for turning the steered wheels 3FR, 3FL irrespective of driver's steering operation, is referred to as "automatic turning control".

As shown in FIG. 3, the ECU 50 includes a traveling area estimation unit 51, a collision possibility determination unit 52 and an assist method selection unit 53. The traveling area estimation unit 51 estimates the traveling area of a crossing target that travels on a course ahead of the host vehicle 1. Estimation of the traveling area will be described with reference to FIG. 4. FIG. 4 shows a state where the host vehicle 1 travels on a first course R1 and another vehicle 100 travels on a second course R2. The first course R1 and the second course R2 intersect with each other at right angles to form a T-intersection. That is, the first course R1 is a course that extends from the second course R2 toward one side. The host vehicle 1 travels on the first course R1 toward the second course R2. The other vehicle 100 travels on the second course R2 toward an intersection with the first course R1. In the example of FIG. 4, the other vehicle 100 travels from the right side toward the left side in the vehicle width direction of the host vehicle 1. Although not shown in FIG. 4, the first course R1 has a narrow front view Fv due to interruption of a structure, such as a building, and the other vehicle 100 is not visually recognized from a driver's position Dr.

Because the right side sensor 32R of the host vehicle 1 is arranged at the front end of the host vehicle 1, the right side sensor 32R detects the other vehicle 100. The right side sensor 32R calculates a relative position and relative velocity of the other vehicle 100 to the host vehicle 1. The right side sensor 32R outputs the calculated information to the traveling area estimation unit 51. The traveling area estimation unit 51 estimates a traveling area AR of the other vehicle 100 on the basis of the information acquired from the right side sensor 32R. The traveling area AR is a future host vehicle forward traveling area of the other vehicle 100 that is a crossing target. In other words, the traveling area AR is a future passage area on the second course R2 according to the width of the other vehicle 100. When the other vehicle 100 approaches the host vehicle 1 from the left side, the traveling area estimation unit 51 just needs to estimate the traveling area AR on the basis of the result calculated by the left side sensor 32L. Information about the traveling area AR estimated by the traveling area estimation unit 51 is output to the collision possibility determination unit 52.

Referring back to FIG. 3, the collision possibility determination unit 52 determines the possibility of a collision of the host vehicle 1 with the detected other vehicle 100. The collision possibility determination unit 52 according to the present embodiment determines the collision possibility on the basis of the traveling area AR and the state of the host vehicle 1. The collision possibility determination unit 52 calculates the collision possibility on the basis of, for example, a stoppable position of the host vehicle 1 when alarm control, deceleration control and brake control are executed. Initially, the alarm control, the deceleration control and the brake control will be described.

The alarm control is control for issuing an alarm to a driver by an alarm device 41. The alarm device 41 is a device that transmits information about the collision possibility, or the like, to the driver by a stimulus, such as voice, light and video. The alarm device 41 is preferably arranged in a vehicle cabin. When there is a possibility that the host vehicle 1 collides with the other vehicle 100, the ECU 50 assists in avoiding a collision with the other vehicle 100 by executing alarm control for prompting driver's braking operation with the use of the alarm device 41.

The deceleration control is control for decelerating the host vehicle 1. The ECU 50 decelerates the host vehicle 1 by, for example, reducing the output of the engine 5 or down-shifting the transmission 6. When there is a possibility that the host vehicle 1 collides with the other vehicle 100, the ECU 50 is able to assist in avoiding a collision with the other vehicle 100 by decelerating the host vehicle 1. When the deceleration control is executed, it is preferable to prompt braking operation by informing the driver of the possibility of collision with the use of the alarm device 41.

The brake control is control for braking the host vehicle 1 with the use of the brake devices 4. The ECU 50 increases braking forces that are respectively generated by the brake devices 4 with the use of the brake control device 10. For example, the ECU 50 is able to assist in, avoiding a collision with the other vehicle 100 through brake assist control. When the brake control is executed, it is preferable to prompt braking operation by informing the driver of the possibility of collision with the use of the alarm device 41. When the vehicle control system 2 according to the present embodiment assists in avoiding a collision with the other vehicle 100, the vehicle control system 2 is able to stop the host vehicle 1 with the use of the brake devices 4 irrespective of driver's braking operation.

The collision possibility determination unit 52 estimates a stoppable position ST on the basis of a current position PN1 of the host vehicle 1 (see FIG. 4) and a current vehicle speed of the host vehicle 1. The current position PN1 and current vehicle speed of the host vehicle 1 are allowed to be acquired from a host vehicle state detection unit 40. The host vehicle state detection unit 40 includes, for example, a host vehicle position detection unit, such as a navigation system, a vehicle speed sensor, an accelerator operation amount sensor, the brake operation amount sensor 22, a shift position sensor, and the like.

The stoppable position ST in the case where the alarm control is executed is a predicted stop position in the case where the host vehicle 1 is stopped by driver's braking operation. The collision possibility determination unit 52 estimates the stoppable position ST on the assumption that the driver carries out braking operation after the alarm control is started. A deceleration at this time may be, for example, a value of average deceleration that is generated at the time when the driver carries out braking operation or a value of general deceleration. Alternatively, a deceleration that has been generated through driver's past braking operation may be learned. In this case, a deceleration that is generated at the time when the driver carries out braking operation may be predicted on the basis of a learned result. In the present embodiment, a deceleration corresponding to 0.4 G is used as a deceleration at the time when emergency avoidance brake operation is carried out by the driver.

The collision possibility determination unit 52 estimates a travel distance until the host vehicle 1 stops as a result of driver's braking operation, and obtains the stoppable position ST on the basis of the estimated value and the current position PN1. The collision possibility determination unit 52 estimates the collision possibility on the basis of the obtained stoppable position ST. The collision possibility determination unit 52 calculates the collision possibility in the case of execution of alarm control on the basis of the positional relationship between the stoppable position ST and the traveling area AR. The collision possibility determination unit 52, for example, calculates the collision possibility such that the collision possibility decreases as the stoppable position ST is distanced from the traveling area AR. The collision possibility determination unit 52, for example, sets the collision possibility to a maximum value when the stoppable position ST is included in the traveling area AR.

The stoppable position ST in the case of execution of the deceleration control is a predicted stop position in the case where the host vehicle 1 is stopped as a result of driver's braking operation and the deceleration control. The collision possibility determination unit 52 estimates the stoppable position ST on the assumption that the deceleration control is executed and the driver carries out braking operation after the alarm control is started. The deceleration at this time is a deceleration that is the sum of the deceleration that is generated as a result of driver's braking operation and the deceleration that is increased through the deceleration control. The collision possibility determination unit 52 calculates the collision possibility in the case of execution of the deceleration control on the basis of the positional relationship between the estimated stoppable position ST and the traveling area AR.

The stoppable position ST in the case of execution of the brake control is the predicted stop position in the case where the host vehicle 1 is stopped by the brake assist control. The collision possibility determination unit 52 estimates the stoppable position ST on the assumption that the brake assist control is executed. The deceleration at this time is a deceleration that is generated by the brake assist control, and is, for example, a maximum deceleration that can be generated by the brake devices 4 of the host vehicle 1. In the present embodiment, a deceleration corresponding to 1.0 G is employed as the maximum deceleration. The collision possibility determination unit 52 calculates the collision possibility in the case of execution of the brake control on the basis of the positional relationship between the estimated stoppable position ST and the traveling area AR. FIG. 5 shows an example of the stoppable position ST at which it is determined that a collision is avoidable and an example of the stoppable position ST1 at which it is determined that a collision is unavoidable. The collision possibility determination unit 52 outputs the collision possibility in the case of execution of the alarm control, the deceleration control and the brake control to the assist method selection unit 53.

The assist method selection unit 53 according to the present embodiment has the function of a controller. When a collision of the host vehicle 1 with the other vehicle 100 traveling in a direction that intersects with the front-rear direction of the host vehicle 1 is predicted, and when a collision with the other vehicle 100 is unavoidable and the other vehicle 100 comes into collision with the host vehicle 1 in the intersecting direction, the assist method selection unit 53 functions as a controller that automatically turns the steered wheels 3FR, 3FL of the host vehicle 1 before the host vehicle 1 collides with the other vehicle 100.

A situation that the assist method selection unit 53 executes automatic turning control is, for example, a situation that a collision with the other vehicle 100 is still unavoidable even when assisting control for collision avoidance is executed through at least one of the deceleration control, the brake control and the alarm control. When a collision of the host vehicle 1 with the other vehicle 100 travelling in a direction that intersects with the front-rear direction of the host vehicle 1 is predicted, the assist method selection unit 53 executes assisting control for assisting in avoiding a collision with the other vehicle 100 by controlling the host vehicle 1 through at least one of the deceleration control, the brake control and the alarm control. Even when the host vehicle 1 is stopped by the assisting control, but when a collision with the other vehicle 100 is still unavoidable, the assist method selection unit 53 attempts to, for example, mitigate damage to the host vehicle 1 through the automatic turning control.

However, not limited to the timing after the assisting control is executed, the assist method selection unit 53 may execute the automatic turning control when a collision with the other vehicle 100 is unavoidable. For example, when the other vehicle 100 comes into collision with the stopped host vehicle 1 because of inattentive driving, or the like, as well, it is possible to mitigate damage through the automatic turning control. When the other vehicle 100 that has collided with a third vehicle comes into secondary collision with the host vehicle 1 as well, it is possible to mitigate damage through the automatic turning control.

When the assist method selection unit 53 turns the steered wheels 3FR, 3FL as the controller, the direction of the turned steered wheels 3FR, 3FL is varied on the basis of whether there is a target other than the other vehicle 100 around the host vehicle 1. Thus, as will be described below, it is possible to not only mitigate damage to the host vehicle 1 but also avoid damage to a pedestrian, or the like. Not only when the other vehicle 100 actually comes into collision in the intersecting direction but also when it is determined that there is a high possibility that the other vehicle 100 comes into collision in the intersecting direction, the assist method selection unit 53 may automatically turn the steered wheels 3FR, 3FL as the controller.

The assist method selection unit 53 according to the present embodiment selects an assist method on the basis of the information that is acquired from the collision possibility determination unit 52 and the information that is acquired from the rear sensor 33. The assist method selection unit 53 is connected to the alarm device 41, the steering control device 12, the brake control device 10, the accelerator-control device 42 and the shift control device 21, and outputs commands to the devices 41, 12, 10, 42, 21.

The operation of the vehicle control system 2 according to the present embodiment will be described with reference to the flowchart of FIG. 1. The control flow of FIG. 1 is, for example, repeatedly executed at predetermined intervals when the system of the host vehicle 1 is in operation.

Initially, in step S10, both right and left sides of the host vehicle 1 are respectively sensed by the right side sensor 32R and the left side sensor 32L. When step S10 is executed, the process proceeds to step S20.

In step S20, the ECU 50 determines whether there is a crossing target. The ECU 50 determines on the basis of the detected result of the right side sensor 32R whether there is a crossing target to the vehicle right side of the host vehicle 1. The crossing target that is subjected to determination here is a possible target that comes into collision with the host vehicle 1 laterally or obliquely. That is, a target that travels in a direction that intersects with the front-rear direction (see the line segment X-X in FIG. 6) of the host vehicle 1 is a target that is subjected to determination as to whether there is a crossing target.

When there is a target that travels in the direction that intersects with the traveling direction of the host vehicle 1 on the basis of the detected result of the right side sensor 32R, the ECU 50 makes affirmative determination in step S20. Similarly, when there is a target that travels in a direction that intersects with the traveling direction of the host vehicle 1 on the basis of the detected result of the left side sensor 32L, the ECU 50 makes affirmative determination in step S20. As a result of determination of step S20, when it is determined that there is a crossing target (Yes in step S20), the process proceeds to step S30; otherwise (No in step S20), the process returns to step S10.

In step S30, the traveling area estimation unit 51 estimates the traveling area AR. The traveling area estimation unit 51 estimates the traveling area AR of the crossing target recognized in step S20. When step S30 is executed, the process proceeds to step S40.

In step S40, the collision possibility-determination unit 52 acquires a host vehicle state. The collision possibility determination unit 52 acquires the host vehicle state, such as the vehicle speed, current position, traveling direction, speed ratio of the transmission 6, accelerator operation amount and brake operation amount of the host vehicle 1, from the host vehicle state detection unit 40. When step S40 is executed, the process proceeds to step S50.

In step S50, the assist method selection unit 53 determines whether the host vehicle 1 does not enter the traveling area AR of the crossing target if the driver carries out emergency avoidance brake operation. The assist method selection unit 53, for example, makes determination in step S50 on the basis of the collision possibility in the case of execution of the alarm control. When the collision possibility in the case of execution of the alarm control, calculated by the collision possibility determination unit 52, is lower than or equal to a predetermined threshold, negative determination is made in step S50. As a result of determination of step S50, when it is determined that the host vehicle 1 does not enter the traveling area AR of the crossing target if the driver carries out emergency avoidance brake operation (No in step S50), the process proceeds to step S120; otherwise (Yes in step S50), the process proceeds to step S60.

In step S120, the assist method selection unit 53 executes first assistance. The first assistance is the alarm control for informing the driver of the collision possibility or required operation by the alarm device 41. The assist method selection unit 53 causes the alarm device 41 to execute the alarm control. The details of an alarm include, for example, information that a collision of the host vehicle 1 with the other vehicle 100 is predicted, information that collision avoidance operation is required, a message prompting braking operation, a message prompting emergency avoidance brake, and the like. When step S120 is executed, the process proceeds to step S10.

In step S60, the assist method selection unit 53 determines whether the host vehicle 1 does not enter the traveling area AR of the crossing target at a physically maximum deceleration. The assist method selection unit 53, for example, makes determination of step S60 on the basis of the collision possibility in the case of execution of the brake control. When the collision possibility in the case of execution of the brake control, calculated by the collision possibility determination unit 52, is lower than or equal to a predetermined threshold, negative determination is made in step S60. As a result of determination of step S60, when it is determined that the host vehicle 1 does not enter the traveling area AR of the crossing target at the physically maximum deceleration (No in step S60), the process proceeds to step S130; otherwise (Yes in step S60), the process proceeds to step S70.

In step S130, the assist method selection unit 53 executes second assistance. The second assistance includes the alarm control and stop assisting control. The stop assisting control includes, for example, the deceleration control and the brake assist control. The brake assist control of the second assistance is brake assist control that generates the physically maximum deceleration of the host vehicle 1 with the use of the brake control device 10. The assist method selection unit 53 executes the alarm control and also executes the brake assist control. The assist method selection unit 53 executes similar alarm control to the alarm control of the first assistance. The assist method selection unit 53 instructs the brake control device 10 to control hydraulic pressures that are respectively supplied to the brake devices 4 of the wheels 3 so that the host vehicle 1 generates the maximum deceleration. When step S130 is executed, the process proceeds to step S10.

In step S70, the assist method selection unit 53 determines whether a collision is avoidable if the host vehicle 1 is allowed to travel backward. The situation that affirmative determination is made in step S50 and step S60 is a situation that entry of the host vehicle 1 into the traveling area AR of the other vehicle 100 that is the crossing target is unavoidable. However, even when the host vehicle 1 has entered the traveling area AR, a collision may be avoidable if the host vehicle 1 travels backward.

The assist method selection unit 53 determines whether a collision is avoidable by automatically causing the host vehicle 1 to travel backward. The assist method selection unit 53, for example, determines whether a collision is avoidable through backward travel control on the assumption that the brake control is executed. When affirmative determination is made in step S60, the stoppable position ST in the case of execution of the brake control is a position inside the traveling area AR, typically, the stoppable position ST1 indicated by the dashed line in FIG. 5. The assist method selection unit 53 predicts whether a collision with the other vehicle 100 is avoidable by executing the backward travel control after the host vehicle 1 has stopped at the stoppable position ST1.

The assist method selection unit 53 calculates a required time from the start of the brake control at the current position PN2 to a stop of the host vehicle 1 at the stoppable position ST1 and a required time from the start of the backward travel control after the stop of the host vehicle 1 at the stoppable position ST1 to completion of an exit of the host vehicle 1 out of the traveling area AR. The assist method selection unit 53 compares the sum of these two required times with a predicted time from the present time as a start point until the other vehicle 100 reaches the stoppable position ST1. As a result of the comparison, when the sum of the required times is shorter than the predicted time until the other vehicle 100 reaches the stoppable position ST1, affirmative determination is made in step S70. As a result of determination of step S70, when it is determined that a collision is avoidable if the host vehicle 1 is allowed to travel backward (Yes in step S70), the process proceeds to step S140; otherwise (No in step S70), the process proceeds to step S80.

In step S80, the assist method selection unit 53 determines that a collision is unavoidable. When step S80 is executed, the process proceeds to step S90.

In step S90, the assist method selection unit 53 determines whether there is no pedestrian on a side across from a collision side. Because it is already determined that a collision with the other vehicle 100 is unavoidable, the assist method selection unit 53 executes the automatic turning control so that damage due to the collision is mitigated. Initially, the concept of the automatic turning control will be described with reference to FIG. 6.

FIG. 6 shows a state where the host vehicle 100 travels on the first course R1 straight ahead and enters the second course R2. The other vehicle 100 that has been traveling on the second course R2 collides with the host vehicle 1 from the vehicle right side of the host vehicle 1. This collision mode is a so-called lateral collision that the other vehicle 100 collides with the host vehicle 1 from a side of the host vehicle 1. In the collision shown in FIG. 6, a traveling direction D1 of the other vehicle 100 is a direction perpendicular to the front-rear direction X-X of the host vehicle 1. In the example of FIG. 6, the direction Dt of the steered wheels 3FR, 3FL is the same as the front-rear direction X-X of the host vehicle 1. In this case, against the collision of the other vehicle 100, the steered wheels 3FR, 3FL generate large friction force to suppress movement of the host vehicle 1. That is, the host vehicle 1 fully receives the collision energy of the other vehicle 100, so the host vehicle 1 receives large impact.

In contrast, as shown in FIG. 7 or FIG. 8, in a state where the steered wheels 3FR, 3FL are turned, it is possible to reduce impact by converting the collision energy of the other vehicle 100 to the kinetic energy of the host vehicle 1. For example, as shown in FIG. 7, assuming that the steered wheels 3FR, 3FL are turned toward the other vehicle 100 with respect to the front-rear direction X-X of the host vehicle 1. That is, assuming that the direction Dt of the steered wheels 3FR, 3FL is directed toward the vehicle right side with respect to the front-rear direction X-X. In this case, when the other vehicle 100 laterally collides with the host vehicle 1 from the vehicle right side, the host vehicle 1 travels backward as indicated by the arrow Y1. The host vehicle 1 presumably travels backward while moving the vehicle front to the vehicle left side.

Thus, the host vehicle 1 moves in a direction to exit from the traveling area AR. Thus, through the automatic turning control, it is possible to cause the collision energy resulting from the collision with the other vehicle 100 to escape and to retreat the host vehicle 1 from the traveling area AR. That is, when the assist method selection unit 53 according to the present embodiment executes the automatic turning control as the controller, the assist method selection unit 53 controls the moving direction of the host vehicle 1 after the collision with the other vehicle 100 by turning the steered wheels 3FR, 3FL toward a direction different from the direction of the steered wheels 3FR, 3FL before turning of the steered wheels 3FR, 3FL is started, that is, for example, toward the other vehicle 100.

However, there is a situation that such automatic turning control that the host vehicle 1 is caused to travel backward at the time of a collision is undesirable. For example, as shown in FIG. 8, this is the case where there is a target, such as a pedestrian 60, on a side across from the other vehicle 100 side in the width direction of the host vehicle 1. In this case, if the host vehicle 1 moves as shown in FIG. 7, there is a possibility that the host vehicle 1 contacts the pedestrian 60. It is desirable to avoid contact of the host vehicle 1 with the pedestrian 60, or the like.

In the case where the other vehicle 100 comes into collision with the host vehicle 1 from the vehicle right side, when there is a protected target to the right side of the host vehicle 1, the vehicle control system 2 according to the present embodiment turns the steered wheels 3FR, 3FL toward the left side. Thus, the steered wheels 3FR, 3FL resist against movement of the host vehicle 1 toward the pedestrian 60. The steered wheels 3FR, 3FL turned toward the pedestrian 60 generates large frictional resistance force against movement of the host vehicle 1 toward the pedestrian 60. Thus, movement of the host vehicle 1 toward the pedestrian 60 based on the collision energy is restricted.

In addition, because the steered wheels 3FR, 3FL are turned toward the pedestrian 60, the host vehicle 1 travels forward as indicated by the arrow Y2 in FIG. 8 because of the collision energy at the time when the other vehicle 100 collides with the host vehicle 1. The host vehicle 1 presumably travels forward while moving the vehicle front toward the vehicle left side. Thus, an approach of the host vehicle 1 to the pedestrian 60 is suppressed. In this way, when the assist method selection unit 53 executes the automatic turning control as the controller, the assist method selection unit 53 controls the moving direction of the host vehicle 1 after the collision with the other vehicle 100 by turning the steered wheels 3FR, 3FL toward the direction different from the direction of the steered wheels 3FR, 3FL before turning of the steered wheels 3FR, 3FL is started, that is, for example, toward the pedestrian 60. Through the automatic turning control, the collision energy is converted to the kinetic energy of the host vehicle 1, and impact at the time of the collision is mitigated.

As described above, when there is no target other than the other vehicle 100 around the host vehicle 1, that is, when no target other than the other vehicle 100 is detected, the assist method selection unit 53 according to the present embodiment turns the steered wheels 3FR, 3FL toward the other vehicle 100 as shown in FIG. 7. Even when there is a target other than the other vehicle 100 around the host vehicle 1, but when the target is on the same side as the other vehicle 100 that comes into collision in the width direction of the host vehicle 1, automatic turning toward the other vehicle 100 may be allowed. On the other hand, when there is a predetermined protected target (hereinafter, simply referred to as "protected target") on the side across from the other vehicle 100 side in the width direction of the host vehicle 1, the assist method selection unit 53 turns the steered wheels 3FR, 3FL toward the target side as shown in FIG. 8. When there is a target other than the other vehicle 100 to the rear of the host vehicle 1 as well, automatic turning toward the side across from the other vehicle 100 side may be carried out.

The phrase "there is a protected target on the side across from the other vehicle 100 side in the width direction of the host vehicle 1" indicates that a protected target is located on the side across from the side of the other vehicle 100 coming into collision with respect to the center line in the width direction of the host vehicle 1. For example, in FIG. 8, the line segment X-X indicating the front-rear direction is drawn along the center line in the width direction of the host vehicle 1. The other vehicle 100 is located on the vehicle right side of the center line (line segment X-X). Thus, a target that is located on the vehicle left side of the center line (line segment X-X) is allowed to be determined as a target that is present on the side across from the other vehicle 100 side in the width direction of the host vehicle 1. The target that is present on the side across from the other vehicle 100 side is typically, a pedestrian, or the like, to the left side of the host vehicle 1.

When there is a target in a left-side area with respect to the center line of the host vehicle 1, the assist method selection unit 53 may constantly make affirmative determination in step S90 (determination that there is a target). However, for part of the left-side area, negative determination may be made in step S90 (determination that there is no target) even when there is a target in that area. For example, when there is a target in an area to the left front side of the host vehicle 1 within the left-side area with respect to the center line, there is a possibility that the host vehicle 1 contacts the target when the host vehicle 1 moves forward at the time of a collision. In this case, the possibility of contact with the target may be reduced when the host vehicle 1 travels backward at the time of the collision. In this way, the assist method selection unit 53 may determine in step S90 that there is a target when there is a target to the left side or left rear of the host vehicle 1; whereas the assist method selection unit 53 may determine in step S90 that there is no target to the left front of the host vehicle 1. The left side is a region on the vehicle left side of the host vehicle 1, and indicates a range between the front end and rear end of the host vehicle 1 in the front-rear direction of the host vehicle 1.

When a collision of the other vehicle 100 with the host vehicle 1 is unavoidable, the vehicle control system 2 according to the present embodiment executes the automatic turning control, and executes brake-off control for cancelling braking with the use of the brake devices 4. The vehicle control system 2 allows rotation of the wheels 3 by reducing hydraulic pressures that are respectively supplied to the brake devices 4 or completely releasing the hydraulic pressures at least before the instance of the collision. Thus, the effect of mitigating impact due to the collision is increased.

As a result of determination of step S90, when it is determined that there is no pedestrian on the side across from the collision side (No in step S90), the process proceeds to S110; otherwise (Yes in step S90), the process to step S100.

In step S110, the assist method selection unit 53 carries out third assistance. The third assistance according to the present embodiment includes the alarm control, the stop assisting control, the automatic turning control and occupant protection control. As described with reference to FIG. 7, the automatic turning control in the third assistance is control for automatically turning the steered wheels 3FR, 3FL toward the other vehicle 100. The stop assisting control is control for assisting in stopping the host vehicle 1. The occupant protection control is control for protecting an occupant. The assist method selection unit 53 initially alarms that a collision with the other vehicle 100 is predicted, or the like, through the alarm control. The details of the alarm control, for example, include information that a collision with the other vehicle 100 is unavoidable, prompting the emergency avoidance brake, executing the automatic turning control, and the like.

The assist method selection unit 53 executes the stop assisting control together with the alarm control. The details of the stop assisting control are, for example, similar to the details of the stop assisting control of the above-described second assistance. The assist method selection unit 53 starts the automatic turning control after the host vehicle 1 has stopped as a result of the stop assisting control or before the host vehicle 1 stops. The start timing of the automatic turning control is, for example, determined on the basis of a collision time. The collision time is a time until the other vehicle 100 collides with the host vehicle 1.

In the automatic turning control, the assist method selection unit 53 outputs, to the steering control device 12, a turning command to turn the steered wheels 3FR, 3FL toward the other vehicle 100. The assist method selection unit 53 instructs the brake control device 10 to release the brake devices 4 of the wheels 3. When the assist method selection unit 53 releases the brake devices 4, the assist method selection unit 53 outputs a command to release all the hydraulic pressures that are supplied to the wheels 3. In this case, even when the braking operation is carried out by the driver, the brake devices 4 may be configured to be released.

The assist method selection unit 53 starts turning of the steered wheels 3FR, 3FL at least before the other vehicle 100 collides with the host vehicle 1. For example, when the steered wheels 3FR, 3FL are turned to a target steered angle, the start of turning may be determined on the basis of a time that is required to turn the steered wheels 3FR, 3FL to the target steered angle. That is, when a time t [sec] is required to turn the steered wheels 3FR 3FL from the current steered angle to the target steered angle, the turning may be started t [sec] before predicted collision time. The timing of releasing the brake devices 4 of the wheels 3 is desirably the timing before the other vehicle 100 collides with the host vehicle 1; however, the brake devices 4 may be released simultaneously with the collision or after the collision.

The assist method selection unit 53 further executes the occupant protection control. The occupant protection control is, for example, control for automatically carrying out rolling up of an occupant's seatbelt, initialization of a seat position, activation of an airbag, closing of car windows, and the like. Activation of the airbag may be started before the other vehicle 100 actually collides with the host vehicle 1. The occupant protection control is started at least before the other vehicle 100 collides with the host vehicle 1.

When the other vehicle 100 actually collides with the host vehicle 1, the assist method selection unit 53 desirably starts braking of the host vehicle 1 at appropriate timing after the collision. By restricting movement of the host vehicle 1 after the collision, a secondary collision of the host vehicle 1, moved by the collision energy, with a surrounding structure, or the like, is suppressed. When step S110 is executed, the control flow ends.

In step S100, the assist method selection unit 53 executes fourth assistance. The fourth assistance according to the present embodiment includes the alarm control, the stop assisting control, the automatic turning control, forward travel control and the occupant protection control. As described with reference to FIG. 8, the automatic turning control in the fourth assistance is control for automatically turning the steered wheels 3FR, 3FL toward the pedestrian 60. The forward travel control is acceleration assist control for assisting in accelerating the host vehicle 1. The assist method selection unit 53 automatically causes the host vehicle 1 to travel forward before the other vehicle 100 collides with the host vehicle 1. Thus, contact of the host vehicle 1 with the pedestrian 60 is suppressed at the time of a collision. The alarm control in the fourth assistance may be similar to that in the third assistance, and may further include an alarm that informs that there is a protected target, such as the pedestrian 60, around the host vehicle 1.

The assist method selection unit 53 executes the stop assisting control together with the alarm control. The details of the stop assisting control are, for example, similar to the details of the above-described second assistance. The assist method selection unit 53 starts the automatic turning control after the host vehicle 1 has stopped as a result of the stop assisting control or before the host vehicle 1 stops. The start timing of the automatic turning control is, for example, determined on the basis of a collision time. The collision time is a time until the other vehicle 100 collides with the host vehicle 1.

In the automatic turning control, the assist method selection unit 53 outputs, to the steering control device 12, a turning command to turn the steered wheels 3FR, 3FL toward the pedestrian 60. In addition, the assist method selection unit 53 outputs, to the brake control device 10, a command to release the brake devices 4 of the wheels 3. That is, when there is a target other than the other vehicle 100 on the side across from the other vehicle 100 side in the vehicle width direction, the assist method selection unit 53 releases the brake devices 4 in addition to automatic turning of the steered wheels 3FR, 3FL. The assist method selection unit 53 starts turning of the steered wheels 3FR, 3FL at least before the other vehicle 100 collides with the host vehicle 1. The start timing of the turning may be, for example, determined similarly to that of the above-described third assistance.

The target steered angle of the fourth assistance will be described with reference to FIG. 9. The target steered angle is a steered angle that is set as a target in the automatic turning control. FIG. 9 shows an instance at which the other vehicle 100 collides with the host vehicle 1. The target steered angle is, for example, determined on the basis of a pedestrian position Ph and a position Pc of the other vehicle 100. The pedestrian position Ph is the position of the pedestrian 60, and is estimated on the basis of the detected result of the left side sensor 32L. The position Pc of the other vehicle 100 is, for example, the position of a portion that collides with the host vehicle 1 within the other vehicle 100. In the present embodiment, the position of the left front end of the other vehicle 100 is set as the position Pc of the other vehicle 100.

An imaginary line segment L1 connects the position Pc of the other vehicle 100 with the pedestrian position Ph. The target steered angle is determined such that the direction Dt of the steered wheels 3FR, 3FL intersects with the imaginary line segment L1 at right angles. The target steered angle (the target direction of the steered wheels 3FR, 3FL) is determined in this way. Thus, the steered wheels 3FR, 3FL are able to effectively restrict movement of the host vehicle 1 toward the pedestrian 60.

The target steered angle may be determined as described with reference to FIG. 10. An imaginary line segment L2 in FIG. 10 connects the pedestrian position Ph with a position Pg of the host vehicle 1. The position Pg of the host vehicle 1 is, for example, the barycenter position of the host vehicle 1. The target steered angle is determined such that the direction of the steered wheels 3FR, 3FL intersects with the imaginary line segment L2 at right angles. A method of determining the target steered angle is not limited to the illustrated ones. It is desirable to appropriately set the target steered angle so that damage to the pedestrian 60, or the like, can be avoided or mitigated.

When the host vehicle 1 is stopped by the stop assisting control, the assist method selection unit 53 executes the forward travel control for automatically causing the host vehicle 1 to travel forward. The assist method selection unit 53 causes the host vehicle 1 to travel forward by using the torque of the engine 5. A target forward travel speed or target forward travel distance of the forward travel control may be set. The target forward travel distance or the target forward travel speed is, for example, determined from the viewpoint of avoiding damage to the pedestrian 60. As an example, the target forward travel speed or the target forward travel distance is determined so that the host vehicle 1 can sufficiently get away from the pedestrian 60 during a period until the host vehicle 1 collides with the other vehicle 100.

The assist method selection unit 53 further executes the occupant protection control. The details and start timing of the occupant protection control may be, for example, similar to those in the above-described third assistance. When step S100 is executed, the control flow ends.

In step S140, the assist method selection unit 53 determines whether there is no obstacle to the rear of the host vehicle 1. The assist method selection unit 53 makes determination of step S140 on the basis of the detected result of the rear sensor 33. An obstacle is typically a following vehicle, and another road crossing person, or the like, is also determined as an obstacle. As shown in FIG. 11, when there is no obstacle to the rear of the host vehicle 1, it can be expected to avoid a collision with the other vehicle 100 by causing the host vehicle 1 to travel backward after having stopped at the stoppable position ST as a result of the stop assisting control. On the other hand, when there is a following vehicle 101 to the rear of the host vehicle 1 as shown in FIG. 12, it is presumable that there is no room for causing the host vehicle 1 to travel rearward after the host vehicle 1 has stopped as a result of the stop assisting control.

Because the control flow is repeatedly executed, the assist method selection unit 53 is allowed to determine whether to execute the backward travel control in response to a situation to the rear of the host vehicle 1 after the host vehicle 1 has stopped as a result of the stop assisting control. As a result of determination of step S140, when it is determined that there is no obstacle to the rear of the host vehicle 1 (No in step S140), the process proceeds to step S150; otherwise (Yes in step S140), the process proceeds to step S160.

In step S150, the assist method selection unit 53 executes fifth assistance. The fifth assistance includes the alarm control, the stop assisting control and control for assisting in causing the stopped host vehicle 1 to travel backward. The stop assisting control is, for example, similar to that in the above-described second assistance. The control for assisting in backward travel according to the present embodiment is the backward travel control for automatically causing the host vehicle 1 to travel backward. When a collision with the other vehicle 100 at the stop position of the host vehicle after execution of the stop assisting control is predicted (Yes in S60), and when there is no obstacle to the rear of the host vehicle 1 (No in S140), the assist method selection unit 53 assists in avoiding a collision with the other vehicle 100 through the backward travel control.

In the backward travel control, the assist method selection unit 53 changes the transmission 6 into a reverse shift state, releases the brake devices 4, and causes the host vehicle 1 to travel backward by the torque of the engine 5. That is, the assist method selection unit 53 instructs the shift control device 21 to shift into reverse range, instructs the brake control device 10 to release the brake devices 4, and instructs the accelerator control device 42 to cause the engine 5 to output a target driving torque. The assist method selection unit 53 causes the host vehicle 1 to travel backward within a controllable range of reverse acceleration. When the assist method selection unit 53 starts the backward travel control, the assist method selection unit 53 may inform the driver in advance of executing the backward travel control.

When the assist method selection unit 53 causes the host vehicle 1 to travel backward to a position at which a collision with the other vehicle 100 is avoidable, the assist method selection unit 53 completes the backward travel control. When the assist method selection unit 53 completes the backward travel control, the assist method selection unit 53 desirably informs the driver of completion of the backward travel control or completion of the series of assisting controls. When the assist method selection unit 53 completes the backward travel control, the assist method selection unit 53, for example, keeps the host vehicle 1 in a stopped state with the use of the brake devices 4. When step S150 is executed, the control flow ends.

In step S160, the assist method selection unit 53 carries out sixth assistance. The sixth assistance is damage mitigation assistance for alarming an occupant and mitigating damage to the occupant due to a collision by controlling various devices. The assist method selection unit 53 alarms the occupant of a collision with the other vehicle 100 with the use of the alarm device 41. In addition, the assist method selection unit 53 prohibits the backward travel control and executes the occupant protection control for protecting the occupant of the host vehicle 1. When step S160 is executed, the control flow ends.

As described above, with the vehicle control system 2 according to the present embodiment, it is possible to mitigate damage in the case of an unavoidable intersection collision with the other vehicle 100. The vehicle control system 2 is able to not only mitigate damage to the host vehicle 1 but also avoid or mitigate damage to the protected target, such as the pedestrian 60, around the host vehicle 1.

The vehicle control system 2 according to the present embodiment gives a higher priority to mitigation of a collision through driver's operation (first assistance in step S120 of FIG. 1) on the basis of, for example, the positional relationship between the host vehicle 1 and the other vehicle 100. When there is a high possibility that a collision is unavoidable by only the driver's operation (Yes in step S50), the vehicle control system 2 assists in avoiding a collision (second assistance in step S130) by intervening the brake control. When a collision is still unavoidable by the brake control (Yes in step S60), the vehicle control system 2 assists in avoiding a collision (fifth assistance in step S150) by causing the host vehicle 1 to travel backward. In addition, when a collision is still unavoidable by causing the host vehicle 1 to travel backward (No in step S70), the vehicle control system 2 assists in mitigating damage through the automatic turning control.

In mitigation of damage, when there is a protected target around the host vehicle 1 (Yes in step S90), the vehicle control system 2 assists in suppressing an approach of the host vehicle 1 to the protected target (fourth assistance in step S100) so as not to cause damage to the protected target. On the other hand, when there is no protected target around the host vehicle 1 (No in step S90), the vehicle control system 2 assists in causing the host vehicle 1 to travel backward at the time of a collision (third assistance in step S110) so as to mitigate damage to the host vehicle 1.

Depending on a situation, it is presumable that there is a case where the operation as shown in FIG. 1 is not executed. For example, although the vehicle control system 2 determines that the brake assist control is required, there is a possibility that a collision occurs before the brake assist control is started or the possibility that a collision occurs without substantially executing the brake assist control. As an example, although affirmative determination is made in step S60, but when the driver generates a deceleration larger than or equal to the maximum deceleration (for example, corresponding to 1.0 G) through the braking operation, it is presumable that the host vehicle 1 stops without executing the brake assist control by the vehicle control system 2 and then comes into collision. Alternatively, when the other vehicle 100 collides with the host vehicle 1 in a short period of time from when the side sensors 32R, 32L detect the other vehicle 100, it is presumable that the host vehicle 1 comes into collision without executing the brake assist control.

Thus, the vehicle control system 2 according to the present embodiment desirably assists in avoiding a collision with the other vehicle 100 by controlling the host vehicle 1 through the brake control; however, there is also a possibility that the host vehicle 1 comes into collision without assisting in avoiding a collision through the brake control. It is also presumable that there is a situation that the other vehicle 100 approaches laterally and collides with the already stopped host vehicle 1. In such a case, the alarm control may be executed without executing the deceleration control or the brake control, and then the other vehicle 100 may collide with the host vehicle 1.

Even in these cases where the host vehicle 1 comes into collision without the brake control, with the automatic turning control that is executed by the vehicle control system 2 according to the present embodiment, it is possible to mitigate damage to the host vehicle 1 or protect the pedestrian 60, or the like.

The assist method selection unit 53 may be configured to, after the host vehicle 1 has stopped without executing the brake control or the deceleration control, assist in avoiding a collision with the other vehicle 100 through the backward travel control. That is, the assist method selection unit 53 may be configured to assist through the backward travel control when a collision with the other vehicle 100 is predicted at the stop position of the host vehicle 1 after any one of the deceleration control, the brake control and the alarm control is executed.

The courses R1, R2 according to the present embodiment are, for example, roads; however, at least one of the courses R1, R2 may be a course in a place, such a parking lot. As for a situation that an intersection collision tends to occur, there are a situation that a vehicle exits from a parking lot into a road, a situation that a vehicle enters an intersecting portion of courses in a place of a parking lot, a situation that a vehicle exits from a parking space to a course, and the like. In such situations, with assistance executed by the vehicle control system 2 according to the present embodiment, it is possible to avoid a collision itself or mitigate damage due to a collision.

In the present embodiment, the first course R1 and the second course R2 intersect with each other at right angles; however, the angle of intersection is not limited to the right angles. For example, it may be an intersection mode in which the first course R1 obliquely merges into the second course R2.

In the present embodiment, the situation that the host vehicle 1 approaches the other vehicle 100 in a traveling situation that the host vehicle 1 is operated by the driver is described; however, the traveling situation is not limited to this situation. For example, when the host vehicle 1 is traveling under partially or entirely automatic control as well, there is a possibility that the host vehicle 1 approaches the other vehicle 100. Typically, there are a situation that the other vehicle obliquely or laterally comes into collision with the stopped host vehicle 1, a situation that collision avoidance is not in time when the other vehicle 100 is detected, a situation that collision avoidance is not in time because the other vehicle 100 has suddenly changed the traveling direction, and the like. In such cases, the automatic turning control, and the like, according to the invention are allowed to be executed.

Figure 13:
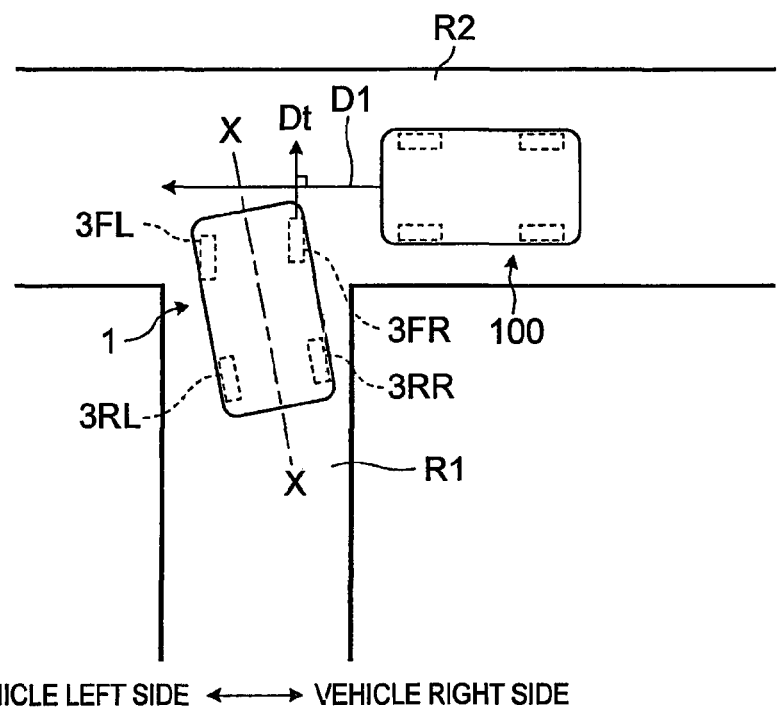
FIG. 13 is a view that shows an example of a collision situation according to a first alternative embodiment to the embodiment.

A first alternative embodiment to the embodiment will be described with reference to FIG. 13. FIG. 13 is a view that shows an example of a collision situation according to the first alternative embodiment to the embodiment. In the above-described embodiment, as shown in FIG. 6, the front-rear direction X-X of the host vehicle 1 and the traveling direction D1 of the other vehicle 100 intersect with each other at right angles. In contrast, in FIG. 13, the front-rear direction X-X of the host vehicle 1 and the traveling direction D1 of the other vehicle 100 obliquely intersect with each other. A method of the automatic turning control in such a case will be described.

It is presumable that the steered wheels 3FR, 3FL generate maximum friction force at the time of a collision when the direction Dt of the steered wheels 3FR, 3FL intersects with the traveling direction D1 of the other vehicle 100 at right angles as shown in FIG. 13. When the steered wheels 3FR, 3FL are turned toward the other vehicle 100 from the current position of the steered wheels 3FR, 3FL, it is presumable that the host vehicle 1 is easy to travel backward at the time of a collision. On the other hand, when the steered wheels 3FR, 3FL are turned toward the vehicle left side from the current position of the steered wheels 3FR, 3FL shown in FIG. 13, it is presumable that the host vehicle 1 is easy to travel forward at the time of a collision.

Thus, a steered angle at which the direction Dt of the steered wheels 3FR, 3FL intersects with the traveling direction D1 of the other vehicle 100 at right angles may be set as a reference steered angle. When a collision with the other vehicle 100 is unavoidable, it may be determined which direction the steered wheels 3FR, 3FL are turned with respect to the reference steered angle in response to whether there is a pedestrian 60, or the like.

A second alternative embodiment to the embodiment will be described. In the above-described embodiment, when the host vehicle 1 stops within the traveling area AR of the other vehicle 100 even as a result of the stop assisting control, collision avoidance based on the backward travel control is considered. Instead or in addition to this, collision avoidance based on the forward travel control after a stop of the host vehicle 1 may be considered. For example, this will be described with reference to FIG. 11. After the host vehicle 1 has stopped at the stoppable position ST, it is presumable that it is possible to avoid a collision with the other vehicle 100 by causing the host vehicle 1 to travel forward. As an example, there is a case where the course width of the second course R2 is wide and it is allowed to stop the host vehicle 1 in an area inside the second course R2 and outside the traveling area AR.

When the first course R1 and the second course R2 intersect with each other as not a T-intersection but a crossroad, there is a possibility that a collision with the other vehicle 100 is avoidable by causing the host vehicle 1 to travel forward. When there is an obstacle to the rear of the host vehicle 1 or when there is a higher possibility of collision avoidance when the host vehicle 1 is caused to travel forward than when the host vehicle 1 is caused to travel backward, the assist method selection unit 53 may assist in avoiding a collision by automatically causing the host vehicle 1 to travel forward.

A third alternative embodiment to the embodiment will be described. In the above-described embodiment, the vehicle control system 2 includes the rear sensor 33; instead, the rear sensor 33 may be omitted. In this case, the vehicle control system 2 may be, for example, configured not to execute the backward travel control in collision avoiding assistance.

In the above-described embodiment, the backward travel control is automatically executed; instead, control for assisting the driver in reverse operation may be executed. For example, the host vehicle 1 has stopped as a result of the stop assisting control, the driver may be prompted to carry out reverse operation by placing the host vehicle 1 in a backward travelable state. That is, the host vehicle 1 may be configured to travel backward when the transmission 6 is changed to reverse shift position, the brake control is completed and the driver completes the braking operation.

A fourth alternative embodiment to the embodiment will be described. The automatic turning control, and the like, according to the above-described embodiment or any one of the alternative embodiments may be configured to allow driver's override. For example, during execution of the automatic turning control, when the driver carries out steering operation for turning the steered wheels in a direction different from the turning direction of the automatic turning control, driver's steering operation may be given a higher priority, and the automatic turning control may be suspended or completed. When the driver completes the braking operation during execution of the stop assisting control or when the driver carries out depressing operation on the accelerator pedal 15, the stop assisting control may be suspended or completed.

After the vehicle control system 2 releases the brake devices 4, when the driver increases a depression amount on the brake pedal 16, forcible release of the brake devices 4 may be completed. When the driver depresses the brake pedal 16 or increases the depression amount on the brake pedal 16 during execution of the backward travel control, the backward travel control may be suspended or completed. Similarly, when the driver depresses the brake pedal 16 or increases the depression amount on the brake pedal 16 during execution of the forward travel control, the forward travel control may be interrupted or completed.

A fifth alternative embodiment of the invention will be described. The steering control device 12 according to the above-described embodiment is configured to turn the steered wheels 3FR, 3FL with the use of the rotary driving source, such as a motor; instead, for example, a mechanism that hydraulically turns the steered wheels 3FR, 3FL may be employed.

A sixth alternative embodiment of the invention will be described. In the above-described embodiment, the forward, travel control is executed in the fourth assistance; instead, the host vehicle 1 may be configured to be easy to travel forward by simply setting the brake devices 4 in a released state in advance without executing the forward travel control.

The details described in the above embodiment and alternative embodiments may be implemented in combination as needed.

The invention claimed is:

1. A vehicle control system, comprising:
   a controller configured to, when a collision of a host vehicle with another vehicle traveling in an intersecting direction that intersects with a front-rear direction of the host vehicle is predicted, when the collision with the other vehicle is unavoidable and when the other vehicle is about to come into collision with the host vehicle in the intersecting direction, automatically turn a steered wheel of the host vehicle before the host vehicle collides with the other vehicle, the controller being configured to vary a direction of the steered wheel that is turned by the controller in response to whether there is a target, other than the other vehicle, around the host vehicle;
   wherein the controller is configured to, when there is no target, other than the other vehicle, around the host vehicle, turn the steered wheel toward the other vehicle, and
   wherein the controller is configured to, when there is the target, other than the other vehicle, on a side across from the other vehicle side in a width direction of the host vehicle, turn the steered wheel toward the target side.

2. The vehicle control system according to claim 1, wherein
   the controller is configured to, when the collision of the host vehicle with the other vehicle is predicted, execute assisting control for assisting in avoiding the collision with the other vehicle by controlling the host vehicle through at least one of deceleration control, brake control, and alarm control, and
   the controller is configured to, when the collision with the other vehicle is unavoidable even by executing the assisting control, automatically turn the steered wheel.

3. The vehicle control system according to claim 2, wherein
   the controller is configured to further execute backward travel control for automatically causing the host vehicle to travel backward, and
   the controller is configured to, when a collision with the other vehicle is predicted at a stop position of the host vehicle after execution of any one of the deceleration control, the brake control and the alarm control, and when there is no obstacle to a rear of the host vehicle, assist in avoiding the collision with the other vehicle through the backward travel control.

4. The vehicle control system according to claim 3, wherein
   the controller is configured to, when there is an obstacle to the rear of the host vehicle, prohibit the backward travel control and execute protection control for protecting an occupant of the host vehicle.

5. The vehicle control system according to claim 1, wherein
   the controller is configured to control a moving direction of the host vehicle after the collision with the other vehicle by turning the steered wheel in a direction different from the direction of the steered wheel before turning of the steered wheel by the controller is started.

6. The vehicle control system according to claim 1, wherein
   the controller is configured to, when there is the target, other than the other vehicle, on the side across from the other vehicle side in the width direction of the host vehicle, release a brake device in addition to automatic turning of the steered wheel.

7. The vehicle control system according to claim 1, wherein
   the controller is configured to, when there is the target, other than the other vehicle, on the side across from the other vehicle side in the width direction of the host vehicle, further execute forward travel control for automatically causing the host vehicle to travel forward.

8. The vehicle control system according to claim 1, wherein the controller is configured to, when there is no target, other than the other vehicle, around the host vehicle, release a brake device in addition to automatic turning of the steered wheel.

9. A control method for a vehicle, the vehicle including a controller, the control method comprising:
- when a collision of a host vehicle with another vehicle traveling in an intersecting direction that intersects with a front-rear direction of the host vehicle is predicted, when the collision with the other vehicle is unavoidable and when the other vehicle is about to come into collision with the host vehicle in the intersecting direction, automatically turning, by the controller, a steered wheel of the host vehicle before the host vehicle collides with the other vehicle; and
- varying, by the controller, a direction of the steered wheel that is turned by the controller in response to whether there is a target, other than the other vehicle, around the host vehicle,
- wherein the controller, when there is no target, other than the other vehicle, around the host vehicle, turns the steered wheel toward the other vehicle, and
- wherein the controller, when there is the target, other than the other vehicle, on a side across from the other vehicle side in a width direction of the host vehicle, turns the steered wheel toward the target side.

* * * * *